No. 858,192. PATENTED JUNE 25, 1907.
I. LUCAS.
MANUFACTURE OF BLOCKS.
APPLICATION FILED AUG. 31, 1906.
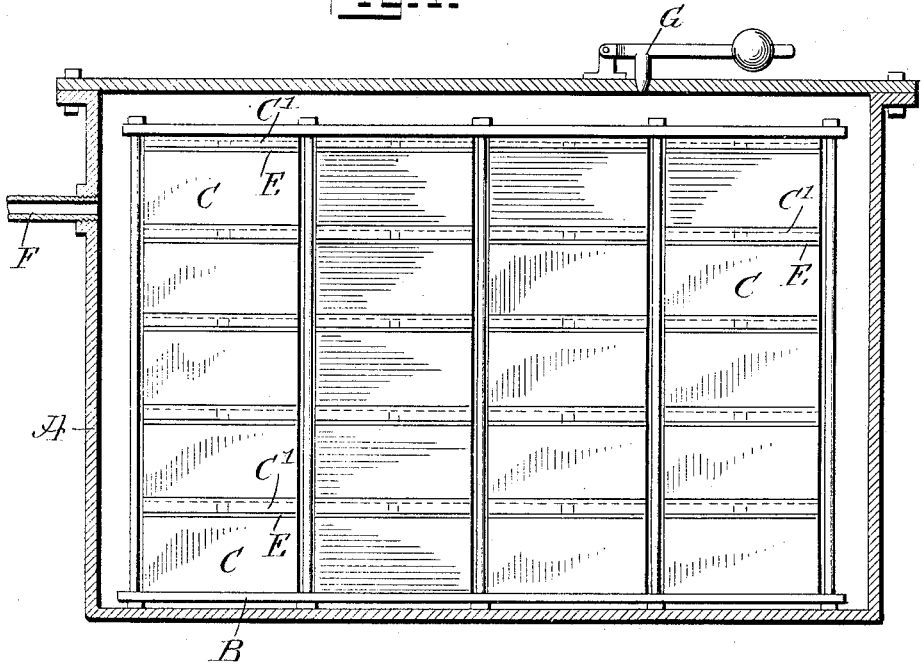
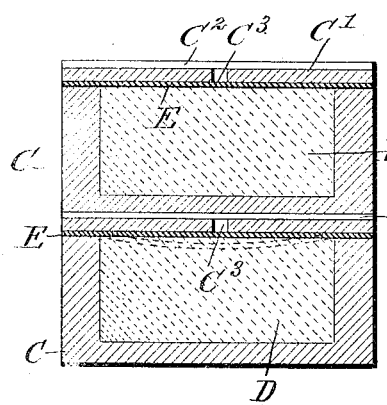
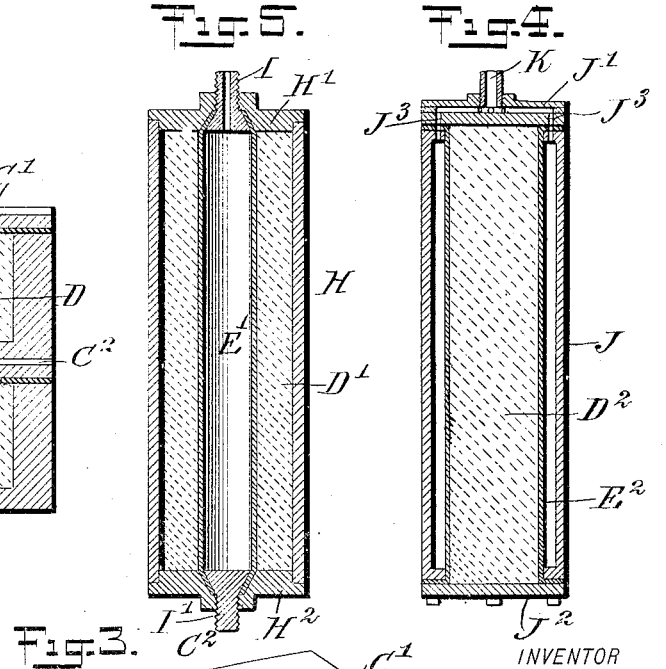
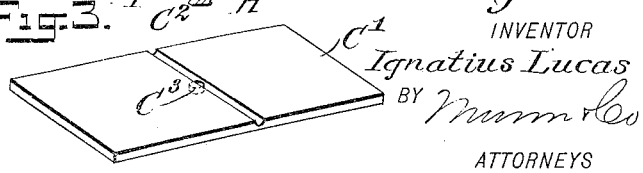
WITNESSES.
Geo. W. Naylor
Geo. J. Hoster
INVENTOR
Ignatius Lucas
BY Munn & Co
ATTORNEYS

UNITED STATES PATENT OFFICE.

IGNATIUS LUCAS, OF PASSAIC, NEW JERSEY.

MANUFACTURE OF BLOCKS.

No. 858,192.　　　　Specification of Letters Patent.　　　　Patented June 25, 1907.

Application filed August 31, 1906. Serial No. 332,742.

*To all whom it may concern:*

Be it known that I, IGNATIUS LUCAS, a citizen of the United States, and a resident of Passaic, in the county of Passaic and State of New Jersey, have invented new and useful Improvements in the Manufacture of Blocks, of which the following is a full, clear, and exact description.

The invention relates to the manufacture of cement blocks, artificial stone blocks and the like, and its object is to provide certain new and useful improvements in the manufacture of blocks made from plastic material, whereby the blocks are rendered highly homogeneous and exceedingly strong and durable.

The invention consists in a mold, whereby the block immediately after being pressed into the desired shape and while wet is subjected to pressure during the setting and hardening of the plastic material.

The invention also consists in means for carrying the above-described method into effect hereinafter described more fully and pointed out in the claims.

A practical embodiment of the invention is represented in the accompanying drawings forming a part of this specification, in which similar characters of reference indicate corresponding parts in all the views.

Figure 1 is a sectional side elevation of the improvement; Fig. 2 is an enlarged sectional side elevation of a plurality of molds in nested condition and while under pressure; Fig. 3 is a perspective view of the mold cover; Fig. 4 is a sectional side elevation of a mold for forming cylindrical blocks, and Fig. 5 is a like view of a mold for forming columns or rollers.

In the chamber A of any approved construction is arranged a stand B for supporting in nested condition molds C each containing plastic material D pressed into the desired shape by a previous operation in a suitable press, and each mold C is provided with a cover C' between which and the material D is interposed a diaphragm E of rubber or other flexible material, as plainly indicated in Figs. 1 and 2. The cover C' for each mold is provided on top with a groove C² extending from one side of the mold to the other, and from the groove C² leads an aperture C³ onto the upper surface of the diaphragm E, so that compressed air or other fluid under pressure contained in the chamber A can pass by way of the groove C² and aperture C³ onto the outer face of the diaphragm E to press the same downward and thereby hold the material D in the mold C under pressure during the setting and hardening of the material D. The chamber A is connected by a pipe F with a reservoir containing compressed air or a like fluid under pressure, and the said pipe F may be connected with an air compressor or other source of fluid pressure supply so as to exert a uniform pressure on the several diaphragms E for the molds C contained at the time in the chamber A, so that the plastic material contained in all the molds C is held under pressure while setting and hardening. The chamber A is provided with a suitable safety valve G set to the desired pressure so as to maintain a uniform pressure in the chamber A.

The mold C shown and described is of the ordinary rectangular form for making ordinary blocks of cement or artificial stone and the like, but when it is desired to make cylindrical blocks D', as shown in Fig. 5, for instance, then a cylindrical mold H is provided having heads H' and H² in which are fastened the ends of a tubular diaphragm E', extending in the central opening of the cylindrical block D'. Suitable nipples I and I' are provided for holding the ends of the diaphragm E' in position in the heads H', H², and the nipple I is apertured to permit fluid under pressure to pass into the flexible and tubular diaphragm E', for the latter to exert an outward pressure against the inner wall of the block D', to keep the latter under pressure while its plastic material is setting and hardening.

In the form shown in Fig. 4, the cylindrical mold J is provided with heads J' and J² and contains the block D² in the form of a roller or column, surrounded by tubular diaphragms E². The head J' is connected by a pipe K with a suitable source of fluid pressure supply, and the said head is provided with ports J³ connecting said pipe K with a space between the inner surface of the mold J and the outer surface of the diaphragm E², so that the fluid under pressure presses the diaphragm E² inwardly against the block D², to keep the same under pressure during the time the plastic material is setting and hardening.

It is understood that the molds H and J and their contents may be set in the chamber A, or the nipple or pipe K may be directly connected with a reservoir containing compressed air or the like, to supply the necessary fluid under pressure for the diaphragms E' and E² contained in the molds H and J.

It is understood that the material for forming a block in the mold is still in a wet or plastic condition after it is pressed into the desired shape by a press or the like, and the material is kept under pressure by the use of the flexible diaphragm until the material has completely set and hardened. Thus it will be seen that a very homogeneous block is manufactured which is capable of resisting high strains and is exceedingly strong and durable.

Having thus described my invention, I claim as new and desire to secure by Letters Patent:

1. The herein described method for manufacturing blocks of plastic material consisting in pressing the material in a mold covering the material with a flexible covering and permitting it to set and harden in the mold and applying pressure to the flexible covering during the setting and hardening of the material.

2. The herein described method for curing blocks of plastic material pressed in a mold, consisting in covering the material with a flexible covering permitting the material to set and harden in the mold, and subjecting the covering to pressure during the setting and hardening.

3. In the manufacture of blocks of plastic material, a mold for containing the material in the pressed state, and having a flexible pressure medium for contact with that part of the material not supported by the mold, and a source of pressure supply for exerting pressure on the said medium whereby the latter will press the said material and keep it under pressure during the setting and hardening thereof.

4. In the manufacture of blocks of plastic material, a chamber connected with a fluid pressure supply, a plurality of molds contained within the said chamber and each filled with a plastic material pressed into shape, and a flexible pressure medium in engagement at one side with the said material and subjected at the other side to the fluid pressure in the said chamber.

5. In the manufacture of blocks of plastic material, a mold containing the plastic material pressed into shape by a previous operation, an apertured and grooved cover for the said mold, a diaphragm interposed between the cover and the plastic material, and means for supplying fluid pressure to the said diaphragm by way of the aperture in the said cover.

In testimony whereof I have signed my name to this specification in the presence of two subscribing witnesses.

IGNATIUS LUCAS.

Witnesses:
   THEO. G. HOSTER,
   EVERARD B. MARSHALL.